United States Patent
Cushman et al.

(10) Patent No.: US 11,696,583 B2
(45) Date of Patent: Jul. 11, 2023

(54) SYSTEMS AND METHODS FOR USE OF CHLORINE DIOXIDE IN CULTIVATION AND POST-HARVEST APPLICATIONS

(71) Applicant: ProKure Solutions, LLC, Phoenix, AZ (US)

(72) Inventors: Alex Joseph Cushman, Phoenix, AZ (US); Bret Bernard Lorenz, Phoenix, AZ (US)

(73) Assignee: Prokure Solutions, LLC, Phoenix, AZ (US)

( * ) Notice: Subject to any disclaimer, the term of this patent is extended or adjusted under 35 U.S.C. 154(b) by 125 days.

(21) Appl. No.: 16/714,577

(22) Filed: Dec. 13, 2019

(65) Prior Publication Data

US 2020/0221701 A1 Jul. 16, 2020

Related U.S. Application Data

(60) Provisional application No. 62/799,736, filed on Jan. 31, 2019, provisional application No. 62/779,366, filed on Dec. 13, 2018.

(51) Int. Cl.
*A01N 59/00* (2006.01)

(52) U.S. Cl.
CPC .................................. *A01N 59/00* (2013.01)

(58) Field of Classification Search
CPC ...................................................... A01N 59/00
See application file for complete search history.

(56) References Cited

U.S. PATENT DOCUMENTS

| | | | |
|---|---|---|---|
| 2007/0036871 A1* | 2/2007 | Westerman | A01N 59/00 424/661 |
| 2012/0100230 A1* | 4/2012 | Harrison | A01N 59/00 424/722 |
| 2018/0082223 A1* | 3/2018 | Birger | G06Q 50/02 |

OTHER PUBLICATIONS

Young, "A systematic review of the literature reveals trends and gaps in integrated pest management studies conducted in the United States", 2017, Pest Management Science, vol. 73, pp. 1553-1558. (Year: 2017).*

* cited by examiner

*Primary Examiner* — Michael B. Pallay
(74) *Attorney, Agent, or Firm* — KW Law, LLP (57) ABSTRACT

Systems and methods of use of chlorine dioxide in controlled environmental agriculture settings and postharvest applications are provided. A method can comprise application of gaseous chlorine dioxide at a level effective to prevent microbial proliferation in a setting containing growing plants. A system can comprise a chemical microorganism control agent dispersal system, an airborne microorganism detection system, and a cultivation environment monitor system.

7 Claims, 3 Drawing Sheets

SYSTEMS AND METHODS FOR USE OF CHLORINE DIOXIDE IN CULTIVATION AND POST-HARVEST APPLICATIONS

CROSS-REFERENCE TO RELATED APPLICATIONS

This application claims the benefit of and priority to U.S. Provisional Application Ser. No. 62/779,366, entitled "SYSTEMS AND METHODS FOR USE OF CHLORINE DIOXIDE IN CULTIVATION AND POST-HARVEST APPLICATIONS," filed Dec. 13, 2018, and U.S. Provisional Application Ser. No. 62/799,736, entitled "SYSTEMS AND METHODS FOR USE OF CHLORINE DIOXIDE IN CULTIVATION AND POST-HARVEST APPLICATIONS," filed Jan. 31, 2019. The entire disclosures of the aforementioned applications are incorporated herein by reference for any purpose.

FIELD

The present disclosure relates to systems and methods for use of chlorine dioxide for treatment of microorganisms in controlled environmental agriculture settings and for post-harvest treatment of plant material.

BACKGROUND

Many pesticidal agents effective for reducing microbial populations on plants or in environments around plants can leave residues on crop products that may be harmful to downstream consumers and are prohibited under various consumer safety regulations. Chlorine dioxide is an attractive alternative to other pesticides and fungicides due to its strong oxidization capacity and broad biocidal spectrum, combined with the low rate of harmful chemical residuals from its use. Chlorine dioxide has been used to kill microorganisms such as bacteria and fungi in water, on surfaces, and in the air. Use of chlorine dioxide gas for sanitation of indoor environments is particularly attractive due to its high penetrability and good diffusivity. Chlorine dioxide is also attractive because it is rapidly dissipated by degradation into inactive and non-toxic byproducts. However, most indoor applications of chlorine dioxide are at high levels suitable to provide sterilization and generally incompatible with human, animal, or plant occupation of treated areas during treatment.

There is therefore a need for a method of controlling microorganism in a controlled environmental agriculture setting using low levels of chlorine dioxide or similar chemistries compatible with crop health and crop quality.

SUMMARY

In various aspects, a system and method of determining an effective application rate of a chemical microorganism control agent in a plant cultivation environment is provided. In various embodiments, a chemical microorganism control agent may be applied in a plant cultivation environment containing a plant crop and provide effective microorganism control while the plant crop remains substantially unaffected.

In various aspects, a system and method of applying a chemical microorganism control agent to post-harvest plant material is provided. In various embodiments, a chemical microorganism control agent may be applied to post-harvest plant material and provide effective microorganism control while the post-harvest plant material remains substantially unaffected. In various embodiments, application of an effective dose of a chemical microorganism control agent during a post-harvest treatment may be sufficient to produce a compliant plant product from a non-compliant plant product. In various embodiments, an effective post-harvest treatment may leave a plant product quality parameter substantially unaffected.

In various embodiments, a method of microorganism control in a plant cultivation environment is provided. A method of microorganism control can comprise determining a plant biomass parameter, a microorganism parameter, and a cultivation environment parameter at a first time and a first location in the plant cultivation environment. A method can further comprise determining an application rate of a chemical microorganism control agent in response to one of the plant biomass parameter, the microorganism parameter, and the cultivation environment parameter. The application rate may be calculated to produce one of an estimated effective control agent concentration and a measured effective control agent concentration. The method can comprise applying the chemical microorganism control agent in the cultivation environment at the first application rate for a first treatment period. A second microorganism parameter may be determined at a second time at the first location, and a microorganism control effect produced by applying the chemical microorganism control agent can be determined by comparing the second microorganism parameter to the first microorganism parameter. Applying the chemical microorganism control agent at the first application rate for a first treatment period may be effective to substantially prevent proliferation of a microorganism. The chemical microorganism control agent can comprise gaseous chlorine dioxide, and the effective control agent concentration may not exceed about 0.1 ppmv during the first treatment period.

A method can comprise determining a first crop parameter at the first time and a second crop parameter at a second time during or following the first treatment period. A crop effect produced by applying the chemical microorganism control agent can be determined by comparing the second crop parameter to the first crop parameter. The microorganism control agent application rate may be adjusted in response to the crop effect.

A method can comprise deploying a process challenge device. The process challenge device can comprise one of a biological indicator and a chemical indicator. A method can comprise determining the effect of applying the chemical microorganism control agent on one of a biological indicator and a chemical indicator in the process challenge device. A biological indicator can comprise any standard biological indicator known to a person of ordinary skill in the art. In various embodiments, a biological indicator can comprise a device containing microorganisms selected to provide a qualitative and/or quantitative response to a low level of gaseous chlorine dioxide that might not be sufficient to register with traditional biological indicator devices used as sterilization process challenge devices. Stated differently, a biological indicator can comprise a device configured to provide a sensitivity suitable to detect and/or measure the contact time of a very low level of gaseous chlorine dioxide.

In various embodiments, a method of microorganism control in a crop production facility is provided. A method can comprise determining a first microorganism parameter at a first time and a first location. The first microorganism parameter can be compared to an action threshold. A crop production facility parameter can also be determined. A method can comprise recommending a microorganism control protocol comprising dispensing a gaseous phase microorganism control agent at a first application rate in response to one of the first microorganism parameter, comparing the first microorganism parameter to an action threshold, and the first crop production facility parameter. A microorganism control protocol can further comprise application of the microorganism control agent as a solution phase product. The microorganism control agent can be chlorine dioxide. The crop production facility location in which the microorganism control agent is applied can house growing or harvested plant crop.

In various embodiments, a method of sanitizing an aromatic herbaceous crop material is provided. A method can comprise enclosing a crop material in a treatment chamber. A gaseous microorganism control agent is dispensed in the treatment chamber. The crop material is contacted with the gaseous microorganism control agent at a treatment level for a treatment period to produce a treated crop material. A method can further comprise determining a quantity of crop material to be treated, determining an initial microorganism level, determining a quantity of microorganism control agent to be dispensed in response to one of the quantity of crop material to be treated and the initial microorganism control level, and determining an initial concentration of a phytochemical marker. A method can further comprise determining a final microorganism level and a final concentration of the phytochemical marker for the treated crop material. The quantity of microorganism control agent dispensed may be suitable to produce a microorganism level reduction from the initial microorganism level to the final microorganism level. The method may be suitable to produce the microorganism level reduction while producing a limited change in the concentration of the phytochemical marker.

In various embodiments, a system for controlling an abundance of microorganisms in a plant cultivation environment is provided. A system can comprise a chemical microorganism control agent dispersal system, an airborne microorganism detection system, and a cultivation environment monitor system. The system can be configured to dispense an effective amount of a gaseous microorganism control agent in response to an input from the airborne microorganism detection system and the cultivation environment monitor system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The present disclosure generally relates to treatment of a cultivation environment, crop, or harvested plant material with a chemical microorganism control agent in a manner suitable to effectively control microorganism contamination of the environment, crop, or harvested plant material, and more particularly, to treatment of an environment, crop or harvested plant material in a manner that accomplishes effective microorganism control while minimizing any negative impact on crop health or harvested plant material quality. While various embodiments are described herein in sufficient detail to enable those skilled in the art to practice the disclosure, it should be understood that other embodiments may be realized and that logical, procedural, or mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, a chemical microorganism control agent can comprise chlorine dioxide. Chlorine dioxide may be deployed as a solution, a gas, or a combination thereof. A chemical microorganism control agent can comprise any chemical agent suitable to kill, destroy, or prevent the growth of a microorganism.

In various embodiments, a microorganism control method may substantially prevent proliferation of fungal microorganisms without the use of a fungicide, such as any of the fungicides listed in FRAC Code List 2018 (http://www.phi-base.org/images/fracCodeList.pdf), which reference is incorporated herein in its entirety.

In various embodiments, a system and method of determining an effective application rate of a chemical microorganism control agent can comprise determining a treatment environment parameter. In various embodiments, a system and method of determining an effective application rate of a chemical microorganism control agent in a plant cultivation environment can comprise determining at least one of: a cultivation facility configuration, a cultivation room configuration, a cultivation facility room use, a cultivation facility HVAC system configuration, a cultivation facility environmental condition parameter, a chemical interaction parameter (i.e., a chemical interaction with other chemical agents that may be deployed in a cultivation facility or treated room), a microorganism parameter, such as an environmental microorganism load and a plant biomass microorganism load, a plant biomass parameter such as a plant biomass load, and the like.

A microorganism parameter can comprise any measurable microorganism-related variable in an environment to be treated. For example, determining a microorganism parameter can comprise determining a microorganism type, a microorganism density, a microorganism development stage, a microorganism pathogenesis stage, and related factors. In an environment comprising plants to be treated in situ, a microorganism parameter can comprise a plant biomass microorganism load. A plant biomass microorganism load can comprise microorganisms located on the surfaces of plant tissue, within plant tissues, or associated with containers, media and the like associated with plants in cultivation. A microorganism parameter can comprise an environmental microorganism load. Environmental microorganism load may be determined by standard methods of environmental microbiologic sampling, for example, by monitoring or measuring a presence of microorganisms in the air or on surfaces in an environment using techniques such as passive air monitoring, active air monitoring, and surface sampling methods in existence and known to a person of ordinary skill. Active air sampling can include methods such liquid impingement, impaction, filtration, centrifugation, electrostatic precipitation, thermal precipitation, and the like. Microbial detection may be performed using direct methods such as microbial culture and enumeration techniques, or indirect methods such as measurement of adenosine triphosphate (ATP), nicotinamide adenine dinucleotide (NAD), or residual protein or nucleic acid techniques.

For example, a plant biomass parameter can comprise a plant species or genotype, a plant number, a total plant aboveground biomass, a total plant aboveground surface area, a total leaf surface area, a crop leaf morphology, a crop developmental stage, a leaf or flower trichome density and/or trichome type, a crop water stress condition, a crop photosynthesis rate, a crop carbon dioxide assimilation rate, a crop spectral reflectance, or a crop attribute temporal change (e.g., growth rate or dynamic changes in other measured states such as spectral states). A plant biomass parameter can be assessed using any suitable means now known or devices in the future, including manual measurement and estimation as well as any of a variety of remote and proximal sensing and precision agriculture technologies in development. See, for example, Katsoulas et al., 2016, *Crop reflectance monitoring as a tool for water stress detection in greenhouses: A review*, Biosys. Eng. 151: 374-398, the entirety of which is incorporated herein by references for any purpose.

A cultivation facility environmental condition parameter can comprise any measurable environmental condition in a controlled environmental agriculture facility, including relative humidity, airflow level, airflow pattern, light cycle, light intensity, light wavelength, temperature cycle, and the like, along with dynamic changes or patterns of dynamic changes of any such variable.

A cultivation room configuration parameter can comprise information or data regarding room layout, construction materials, furnishings and furnishing materials, surface areas of various material types, surface porosity, and so forth.

In various embodiments, a system and/or method can comprise determining a plurality of the above-listed factors and accounting for each in development of an effective, room or facility-level chemical microorganism control agent application system and method.

In various embodiments, an effective, facility-level chemical microorganism control agent application system and/or method can comprise substantially preventing proliferation of a microorganism.

In various embodiments, an effective microorganism control agent application system and/or method can comprise substantially reducing a microorganism count in an environment or a crop product. Substantially reducing a microorganism count in an environment or crop product may be evaluated on absolute or relative terms. For example, reducing a microorganism count on relative terms can comprise reducing a rate of increase as compared to an untreated environment that experiences a higher rate of microorganism count increase. In some embodiments, reducing a microorganism count can comprise reducing a indoor/outdoor airborne microorganism ratio, in particular where an outdoor airborne microorganism concentration is increasing and producing increases in indoor airborne microorganism concentrations in untreated areas of a facility. In other circumstances, human activities within a facility, such as plant movement, trimming, or harvest, may result in increasing airborne microbial concentrations in the absence of treatment, and chemical microorganism control agent application in accordance with the systems and methods disclosed herein may be suitable to decrease a rate of airborne microbial concentration increase as compared to an untreated environment.

In various embodiments, an effective microorganism control agent application system and/or method can reduce a microorganism count for one or more microorganisms. In various embodiments, a microorganism can include *Botrytis cinereal, Trichothecium roseum, Alternaria alternata. Aspergillus flavus, Aspergillus fumigatus, Aspergillus niger, Aspergillus terreus*, and fungi from the genera *Penicillium, Rhizopus, Mucor*, and *Cladosporium*, among others. Microorganisms can also include bacteria such as bacteria from the genera *Klebsiella, Enterobacter, Enterococcus, Escherichia, Pseudomonas, Listeria*, and *Salmonella.*

A reduction in a microorganism count or level may be quantified in any suitable manner. For example, a microorganism level reduction from the initial (pre-treatment) microorganism level to a post treatment microorganism level may be expressed as a log reduction in the measured number of microorganisms. In various embodiments, a chemical microorganism control agent treatment method may be effective to produce at least one of about a 0.5 log reduction, a 1.0 log reduction, a 1.5 log reduction, a 2.0 log reduction, a 2.5 log reduction, a 3.0 log reduction, a 3.5 log reduction, a 4.0 log reduction, a 4.5 log reduction, a 5.0 log reduction, a 5.5 log reduction, a 6.0 log reduction, and a 7.0 log reduction.

In various embodiments, a chemical microorganism control agent may be generated and/or dispersed in an environment to be treated. For example, a chemical microorganism control agent may be generated in place in the environment to be treated using any suitable system or composition, or a chemical microorganism control agent may generated or produced offsite and delivered to and dispensed in the environment to be treated. The options for generating and delivering or dispersing a chemical microorganism control agent will be dependent on the agent to be used.

In an aspect, a chemical microorganism control agent such as chlorine dioxide may be generated in an area to be treated using a product comprising a chemical composition in a solid matrix configured to produce gaseous chlorine dioxide when exposed to liquid water or moisture in the ambient air. For example, ProKure G Fast Release Gas and ProKure D Extended Release Gas products (ProKure Solutions, Phoenix, Ariz.) may be used to generate chlorine dioxide in accordance with various embodiments described herein. The ProKure G Fast Release Gas product may be used to rapidly generate chlorine dioxide gas in an area to be treated. Gas generation is initiated by inserting the product into about 100 ml of water, and about 1000 mg of chlorine dioxide is produced within about 60 minutes of initiation. The chlorine dioxide gas is generated within the pouch and passively escapes the pouch and is distributed by air distribution and/or equilibration in the surrounding area over about a 120-minute time period. The ProKure D Extended Release Gas product may be used to generate a low level of chlorine dioxide gas over an extended time period, such for up to about 30 days. Generation of chlorine dioxide gas using the ProKure D product is dependent on the amount of water available in the air surrounding the pouch. A higher relative humidity (RH) level in the air in which the product is deployed increases the rate of chlorine dioxide gas generation, and a lower RH produces a lower rate of gas generation. An average rate of release of chlorine dioxide for a ProKure D product deployed in an environment with a RH ranging from 40 to 90% is about 3 mg of chlorine dioxide per hour. Similar to the ProKure G product, chlorine dioxide gas generated by the ProKure D product passively escapes the product pouch and is dispersed by air distribution and equilibration in the environment in which the product is deployed.

In an aspect, chlorine dioxide can be generated on an on-demand basis, including at a continuous, variable, and/or intermittent rate. Chlorine dioxide gas may be generated using any chemical, electrochemical, or other means now known or devised in the future. For example, chlorine dioxide may be generated as described in U.S. patent application Ser. No. 14/878,603, published as U.S. Patent Application Publication No. 2016/0251219, the entirety of which is incorporated herein by reference for any purpose. Under this procedure, chlorine dioxide gas can be generated by reacting ozone gas with a solid chlorite media, and the chlorine dioxide that is produced can be used as a chemical microorganism control agent in gaseous form. This chlorine dioxide generation method is referred to herein as the "clozone" mechanism. (See also US20180055963A1 for further disclosure regarding controls of generation).

In various embodiments, a system and/or method can comprise periodically adjusting a chemical microorganism control agent application rate in response to one of a measured change or a planned change in a treatment environment parameter. In various embodiments, a planned change can comprise an anticipated or modeled change in a treatment environment parameter. For example, an increase in plant biomass in a treated cultivation facility may be modeled based on past cultivation cycle data, and the model may be used to adjust and/or optimize the chemical microorganism control agent application rate to compensate for increased chemical microorganism control agent consumption by the increasing organic matter load produced by the increasing plant biomass. In various embodiments, other changing treatment environment parameters may be similarly monitored or modeled, such as light intensity (e.g., changes in ambient light levels in a greenhouse setting created by seasonal or weather changes), relative humidity, operator traffic, facility operations in adjacent rooms in a facility (e.g., harvest and trimming operations that may contribute to increased organic matter and/or microbial load in a cultivation facility), and the like.

In various embodiments, a system can comprise an array of environmental condition sensors deployed throughout a cultivation facility and configured to measure and return information regarding a treatment environment parameter. In various embodiments, an environmental condition sensor can comprise a temperature sensor, a photosynthetically active radiation sensor, a relative humidity sensor, a carbon dioxide sensor, an air movement sensor, a chemical microorganism control agent sensor, and any other environmental condition sensor presently known or developed in the future. In various embodiments, an environmental condition sensor can comprise a spore trap configured to take air samples and enable determination of the presence of airborne microorganisms (including microorganism spores).

In various embodiments, a system and method can comprise determining a cultivation facility configuration, taking into account cultivation facility room uses. For example, a facility may comprise crop processing facilities or cultivation areas in which crop manipulations are performed that result in dispersal of airborne microorganisms. A system and method of chemical microorganism agent application can comprise targeted dispensing of a chemical microorganism control agent at a rate effective to substantially mitigate risk of microorganism dispersal from the crop processing or manipulation site to adjacent areas of a facility.

In various embodiments, an effective amount of a chemical microorganism control agent may be applied to a crop or harvested plant material without producing a substantial quantity of a treatment byproduct. In various embodiments, a treatment byproduct can comprise a measurable analyte that may be an analyte monitored for product safety purposes.

In various embodiments, a chemical microorganism control agent may be applied to a crop or a harvested plant material for a treatment duration. A treatment duration may be selected to provide a calculated or measured contact time for the chemical microorganism control agent with respect to the treated crop or harvested plant material during the treatment duration, taking into consideration consumption of the chemical microorganism control agent that may occur during the treatment duration due to any of a number of treatment parameters, as described herein. For example, a treatment duration can comprise a period of at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, at least 60 minutes, at least 75 minutes, at least 90 minutes, at least 120 minutes, at least 150 minutes, at least 4 hours, at least 6 hours, at least 12 hours, at least 18 hours, at least 24 hours, at least 48 hours, or at least 72 hours, at least 96 hours, at least 120 hours, at least 144 hours, at least 168 hours, at least 10 days, at least 14 days, at least 21 days, at least 30 days, at least 45 days, at least 60 days, at least 75 days, at least 90 days, or at least 120 days.

In various embodiments, a method of microorganism control in a plant cultivation environment can comprise measuring a chemical microorganism control agent concentration in situ to determine a measured control agent concentration. For example, during treatment of a plant cultivation environment using chlorine dioxide, the actual chlorine dioxide concentration at various sites throughout the treated space may be measured using any suitable instrument. In various embodiments, a chemical microorganism control agent concentration may be measured using a process challenge device such as a biological indicator or a chemical indicator configured to provide a range of sensitivity suitable to enable evaluation of the presence and/or effective concentration of the chemical microorganism control agent used. The measured chlorine dioxide level may be compared to an estimated concentration (i.e., a planned treatment concentration or an estimated effective concentration) of chlorine dioxide for the plant cultivation environment. The estimated concentration may be calculated taking into consideration any of a number of parameters that may influence the actual concentration in the treatment setting, such as the environmental, plant, and microorganism parameters described herein. If the measured level deviates substantially from the estimated concentration, the application rate of the chlorine dioxide in the treated plant cultivation environment may be adjusted accordingly to bring the measured concentration in-line with the estimated concentration. In various embodiments, the control agent concentration may be measured following adjustment of an application rate to verify that the measured concentration is closer to the estimated concentration following the adjustment. The process of concentration measurement and application rate adjustment described above may be repeated as desired.

In various embodiments, an effective amount of a chemical control agent may be applied to a crop or harvested plant material without producing a substantial negative impact on at least one of vegetative growth, flower or fruit (or other harvested plant material) production, or harvested plant material quality. In various embodiments, a harvested plant material quality may be determined using any suitable attribute. For example, harvested plant material quality may be determined using phytochemical analysis to qualitatively and quantitatively measure the presence of one or more phytochemical analytes of interest. In various embodiments, harvested plant material can comprise flower or trim material obtained from *Cannabis* plants. Harvested *cannabis* plant material includes glandular trichomes located on surfaces of the flower and trim material that are of economic value to *cannabis* producers. The glandular trichomes contain various phytochemical components such as cannabinoid, terpene, and flavonoid natural products that confer the bioactive and organoleptic attributes for which *cannabis* is valued. Physical or chemical disruption of the glandular trichome structures prior to consumption or processing by various standard methods such as extraction can result in loss of product quality, thereby producing a negative impact on the harvested *cannabis* plant material quality. Chemical microorganism control agents contemplated herein such as chlorine dioxide have the potential to oxidatively degrade *cannabis* glandular trichome structures located on the surfaces of growing or harvested *cannabis* plant material, as well as to oxidatively degrade the natural products associated therewith. In various embodiments of the present disclosure, application rates of chemical microorganisms control agents may be calculated and/or modulated to avoid or minimize such degradation and associated negative impacts on the quality of treated products. For example, various application rates of gaseous chlorine dioxide may be applied to harvested and cured *cannabis* flower material for different treatment periods, and the *cannabis* natural products extracted from the treated flower material and characterized using extraction and phytochemical profiling methods known to a person of ordinary skill in the art to identify chlorine dioxide concentrations and contact times that may be used without detrimental effects on the qualitative and quantitative phytochemical attributes of the treated plant material. In various embodiments, in addition to avoiding or minimizing a detrimental impact on a product quality parameter, a method of microorganism control in accordance with various embodiments may also be suitable to avoid or minimize the presence of any chemical residuals or byproducts of the treatment method and chemical microorganism control agent on the treated product.

In various embodiments, a method of controlling an airborne microorganism in a controlled environmental agriculture setting in response to anticipated or actual meteorological events is provided. Without wishing to be bound by theory, in various controlled environmental agriculture facilities evaluated and monitored by applicants, substantial increases in airborne microbial populations have been observed in response to meteorological events such as rainfall, high winds, substantial changes in temperature, relative humidity, barometric pressure, and/or cloud cover. Similarly, changes in airborne microbial populations have been observed in response to seasonal climatic changes at various locations. Such changes in airborne microbial populations in an outdoor and/or indoor environment can produce significant impacts on crops cultivated in controlled environmental agriculture facilities in locations affected by such meteorological or seasonal changes. In various embodiments, with suitable historic data, changes in airborne microbial populations in an environment in response to meteorological and/or seasonal climatic changes may be anticipated and mitigated with application of effective amounts of chemical microorganism control agent in response to actual or anticipated meteorological or climatic changes.

For example, gaseous chlorine dioxide may be dispensed immediately before, during, and/or following a rainfall event at a level and in a manner effective to substantially reduce an increase in airborne microorganism concentration that may otherwise occur in the absence of such a treatment. In various embodiments, an application may be effective if an airborne microorganism concentration is reduced as compared to a pre-treatment concentration. An application may be deemed effective if an airborne microorganism concentration is reduced as compared to an equivalent, untreated area. An application may be deemed effective if an airborne microorganism concentration ratio of a treated area to an outdoor area is decreased relative to the ratio prior to treatment.

In various embodiments, a method of microorganism control in a plant cultivation environment is provided. A method of microorganism control can comprise a step of determining, at a first time and a first location, a first plant biomass parameter. A method can comprise determining, at the first time and the first location, a first microorganism parameter. A method can comprise determining, at the first time and the first location, a first cultivation environment parameter. A method can comprise determining a first application rate of a chemical microorganism control agent in response to one of the first plant biomass parameter, the first microorganism parameter, and the first cultivation environment parameter. The first application rate may be calculated to produce one of an estimated control agent concentration and a measured control agent concentration. A method can comprise applying the chemical microorganism control agent in the plant cultivation environment at the first application rate for a first treatment period. A method can comprise determining, at a second time and the first location, a second microorganism parameter. A method can comprise determining a microorganism control effect produced in response to the applying the chemical microorganism control agent for the first treatment period by comparing the second microorganism parameter to the first microorganism parameter.

A method such as the method described above can further comprise determining, at the first time, a first crop parameter and determining, at the second time, a second crop parameter. A method can comprise determining a crop effect produced by the applying the chemical microorganism control agent for the first treatment period by comparing the second crop parameter to the first crop parameter. A method can comprise adjusting, in response to one of determining the microorganism control effect and determining the crop effect, the first application rate to a second application rate.

A first plant biomass parameter can comprise, for example a plant type, a plant growth stage, a plant number, a total plant biomass, a total plant surface area, and a plant surface area attribute.

A first microorganism parameter can comprise, for example, a microorganism type, a microorganism count, a microorganism density, a microorganism development stage, and a microorganism pathogenesis stage.

A first cultivation environment parameter can comprise, for example, one of relative humidity, airflow level, airflow pattern, light cycle, light intensity, light wavelength, and temperature cycle.

In various embodiments, applying the chemical microorganism control agent in the plant cultivation environment at the first application rate for the first treatment period is effective to substantially prevent proliferation of a microorganism.

In various embodiments of a method of microorganism control, the first plant biomass parameter can comprise one of a typical commercial vegetative *cannabis* plant density, a typical commercial flowering *cannabis* plant density, and a typical commercial *cannabis* mother plant density.

In various embodiments, the chemical microorganism control agent can be gaseous chlorine dioxide. In various embodiments of methods using gaseous chlorine dioxide, the estimated control agent concentration or the measured control agent concentration need not exceed about 0.1 ppmv during the first treatment period.

A method of microorganism control in accordance with various embodiments can further comprise measuring, between the first time and the second time, a first measured control agent concentration. The first measured control agent concentration may be compared with the estimated control agent concentration. The first application rate may optionally be adjusted to a second application rate in response to the comparing the measured control agent concentration and the estimated control agent concentration.

A method can further comprise deploying, before the first time and at the first location, a process challenge device comprising one of a biological indicator and a chemical indicator. A method can comprise determining, after the second time, an effect of the applying the chemical microorganism control agent on the one of the biological indicator and the chemical indicator.

In various embodiments, a method of microorganism control in a crop production facility is provided. A method of microorganism control in a crop production facility can comprise determining, at a first time and a first location, a first microorganism parameter. The first microorganism parameter may be compared to an action threshold. The method can comprise determining, for the first time and the first location, a first crop production facility parameter. A microorganism control protocol may be recommended in response to one of the first microorganism parameter, the comparing the first microorganism parameter to an action threshold, and the first crop production facility parameter, a microorganism control protocol. The microorganism control protocol may comprise dispensing a microorganism control agent as a gaseous phase product at a first application rate.

In various embodiments, a method can comprise recommending a microorganism control protocol comprising application of the microorganism control agent as a solution phase product.

The microorganism control agent can comprise chlorine dioxide, and the microorganism control protocol can comprise application of a solution phase product to a hard surface at the first location and application of a gaseous phase product at the first location. In various embodiments, the gaseous phase product may be produced from a solid matrix.

In various embodiments, a first microorganism parameter can comprise one of a microorganism spore count or a microorganism count. The microorganism spore count or microorganism count can be obtained from air sampling using active or passive sampling techniques. In various embodiments, the microorganism spore count or microorganism count is obtained using a spore trap.

In various embodiments, the first location can comprise one of a cultivation room, a post-harvest processing room, and a post-harvest conditioning room. The first location can contain one of a growing plant crop or a harvested plant crop.

In various embodiments, a gaseous phase chlorine dioxide product can comprise one of a rapid release product and an extended release product.

A microorganism control protocol can comprise a microorganism control agent application frequency.

The method of in accordance with various embodiments can further comprise determining, at a second time, a second microorganism parameter at the first location. Determining the second microorganism parameter can be performed following an execution of a microorganism control protocol. The second microorganism parameter can be compared to one of the first microorganism parameter and the action threshold. The method can comprise recommending, in response to one of the second microorganism parameter and the comparing the second microorganism parameter, a post-treatment action. A post-treatment action can comprise applying an extended release gaseous microorganism control agent.

In various embodiments, a method of sanitizing an aromatic herbaceous crop material is provided. A method of sanitizing an aromatic herbaceous crop material can comprise enclosing a crop material in a treatment chamber and dispensing a quantity of a gaseous microorganism control agent in the treatment chamber. The crop material can be contacted with the gaseous microorganism control agent at a treatment level for a treatment period to produce a treated crop material. The method can further comprise determining a quantity of crop material to be treated, determining an initial microorganism level of the crop material, and determining a quantity of microorganism control agent to be dispensed in response to one of the quantity of crop material to be treated and the initial microorganism level. The quantity of microorganism control agent may be effective to produce the treatment level in the treatment period. A method can further comprise determining a first phytochemical initial concentration of the crop material, determining a final microorganism level of the treated crop material, and determining a first phytochemical final concentration of the treated crop material.

In various embodiments of a method of sanitizing an aromatic herbaceous crop material, the quantity of microorganism control agent is suitable to produce a microorganism level reduction from the initial microorganism level to the final microorganism level of at least one of about a 0.5 log reduction, a 1.0 log reduction, a 1.5 log reduction, a 2.0 log reduction, a 2.5 log reduction, a 3.0 log reduction, a 3.5 log reduction, a 4.0 log reduction, a 4.5 log reduction, a 5.0 log reduction, a 5.5 log reduction, a 6.0 log reduction, and a 7.0 log reduction.

In various embodiments of a method of sanitizing an aromatic herbaceous crop material, the method produces a first phytochemical concentration change from the first phytochemical initial concentration to the first phytochemical final concentration of less than one of about a 20% change, a 19% change, an 18% change, a 17% change, a 16% change, a 15% change, a 14% change, a 13% change, a 12% change, an 11% change, a 10% change, a 9% change, an 8% change, a 7% change, a 6% change, a 5% change, a 4% change, a 3% change, a 2% change, and a 1% change.

In various embodiments of a method of sanitizing an aromatic herbaceous crop material, the method can further comprise determining a second phytochemical initial concentration, a third phytochemical initial concentration, and an nth phytochemical initial concentration; and determining a second phytochemical final concentration, a third phytochemical final concentration, and an nth phytochemical final concentration.

In various embodiments, a system for controlling an abundance of microorganisms in a plant cultivation environment is provided. A system for controlling an abundance of microorganisms in a plant cultivation environment can comprise a chemical microorganism control agent dispersal system. A system can also comprise an airborne microorganism detection system. A system can also comprise a cultivation environment monitor system. The plant cultivation environment can comprise growing plants. The system can be configured to dispense an effective amount of a gaseous microorganism control agent in response to an input from one of the airborne microorganism detection system and the cultivation environment monitor system.

In various embodiments of a system for controlling an abundance of microorganisms in a plant cultivation environment, the gaseous microorganism control agent can be chlorine dioxide. The system can be configured to dispense an effective amount of gaseous chlorine dioxide suitable to produce a measured chlorine dioxide rate of from about 0.05 ppmh to about 70 ppmh with a contact time of about 1 hr to about 720 hrs.

In various embodiments, the system is configured to produce a measured chlorine dioxide rate of about 0.10 ppmh with a contact time of about 12 hours.

In various embodiments, the system is configured to produce a measured chlorine dioxide rate of about 1.0 ppmh with a contact time of about 12 hours.

In various embodiments, the system is configured to produce an amount of gaseous chlorine dioxide for a time period effective to produce a reduction in visible fungal growth on a surface of a plant.

By way of non-limiting illustration, examples of various embodiments of the present disclosure are provided below.

Example 1

Effects of Chlorine Dioxide Treatment on Terpene and Cannabinoid Content of Fresh and Dried *Cannabis* Flower Experiments were performed to determine the chlorine dioxide gas dose at which a terpene and/or cannabinoid content of fresh and dried *cannabis* flower were adversely impacted. chlorine dioxide dosage units were determined in mg chlorine dioxide gas/100 grams of flower.

Fresh flower testing was performed using flower from the same plant that was freshly cut or harvested within 1 hour of beginning the trials. Doses of chlorine dioxide used were 0, 10, 14, 25, and 50 mg of chlorine dioxide gas/100 grams of fresh flower. The dose of 0.0 mg chlorine dioxide gas/100 grams of flower was used as the control sample.

For each of the 5 doses, the sample size was approximately 12 grams of fresh flower. Samples were exposed to the chlorine dioxide gas dose within an air-tight 170-liter (45 gallon) container for 18 hours. Following the 18-hour gas treatment period, the samples were dried and cured. Cannabinoid and terpene concentrations were measured after all flower was dried and cured. Each sample was dried and cured as a batch using the same process as typically found in the industry.

A similar experiment was performed using *cannabis* flower that was harvested, dried and cured. Dried and cured flower samples where all from the same plant that was previously harvested, dried, and cured as a batch using a typical industry process. Doses used were 0, 10, 14, 25, and 50 mg of chlorine dioxide gas/100 grams of dry flower. The dose of 0.0 mg chlorine dioxide gas/100 grams of flower was used as the control sample.

For each of the 5 doses, the sample size was approximately 3 grams of dry flower. Samples were exposed to the chlorine dioxide gas dose within an air-tight 35-liter container for 18 hours. Cannabinoid and terpene concentrations were measured for all treated samples.

Phytochemical profiling analysis for all samples was performed by a third-party laboratory. Ultra-High-Performance Liquid Chromatography (UHPLC) was used to characterize and quantify 10 major phytocannabinoids found in *cannabis*. In addition, 21 terpene compounds were characterized and quantified using Head-Space Gas Chromatography with Flame Ionization Detection (HS-GC-FID). The experimental error including both instruments was estimated as approximately 10%. Below are summary data received from the laboratory.

TABLE 1

Fresh flower phytochemical profiling data.

| | Weight % | | | | Changes in Wt. % from control | | | |
|---|---|---|---|---|---|---|---|---|
| Dose | THC | CBD | Total Cannabinoid | Total Terpene | THC | CBD | Total Cannabinoid | Total Terpene |
| 0 | 11.61 | 0.34 | 13.65 | 0.53 | 0.00 | 0.00 | 0.00 | 0.00 |
| 10 | 11.40 | 0.27 | 13.2 | 0.56 | −0.21 | −0.07 | −0.45 | 0.03 |
| 14 | 10.96 | 0.24 | 12.68 | 0.54 | −0.65 | −0.09 | −0.97 | 0.01 |
| 25 | 10.95 | 0.23 | 12.90 | 0.52 | −0.66 | −0.10 | −0.75 | −0.01 |
| 50 | 10.92 | 0.23 | 12.61 | 0.51 | −0.69 | −0.10 | −1.04 | −0.02 |

TABLE 2

Dry flower phytochemical profiling data.

| | Weight % | | | | Changes in Wt. % from control | | | |
|---|---|---|---|---|---|---|---|---|
| Dose | THC | CBD | Total Cannabinoid | Total Terpene | THC | CBD | Total Cannabinoid | Total Terpene |
| 0 | 15.17 | 0.17 | 17.56 | 0.76 | 0.00 | 0.00 | 0.00 | 0.00 |
| 10 | 15.03 | 0.00 | 17.11 | 0.80 | −0.14 | −0.17 | −0.45 | 0.04 |
| 14 | 16.19 | 0.05 | 18.60 | 0.69 | 1.02 | −0.12 | 1.04 | −0.07 |
| 25 | 15.93 | 0.01 | 18.28 | 0.82 | 0.76 | −0.16 | 0.72 | 0.06 |
| 50 | 15.37 | 0.01 | 17.52 | 0.78 | 0.20 | −0.16 | −0.04 | 0.02 |

The results show that none of the chlorine dioxide treatment rates used produced substantial changes in the total cannabinoid or terpene concentrations. The small changes seen in the raw data are all within experimental error of the control sample. Although the data suggest that no adverse impact was found, at doses of 25 mg and 50 mg, the terpene smell was diminished to the human nose.

Example 2

Effects of Chlorine Dioxide on Vegetative Growth

Experiments were performed to determine the effects of using a continuous release dose of about 3 mg of chlorine dioxide per hour on the vegetative growth of *cannabis* plants.

Cannabis plants were placed in a grow tent and grown under artificial lighting for 10 days. Leaf counts were performed prior to placing in the tent and again after 10 days. Two separate grow tents were used, one for the experiment and one as the control. The total leaf count was compared between the experimental and control plants. Temperature and relative humidity measurements were taken 3 times per day to ensure both tents maintained the same environmental conditions.

Each tent had a total volume of 240 cubic feet and an identical grow light placed inside. A pouch was hung from the top of the inside of the experimental tent. The pouch dispensed approximately 3 mg of chlorine dioxide per hour for the duration of the trial (10 days). Within the experimental tent the cannabis plants were exposed to about 720 mg of gaseous chlorine dioxide over the 10-day period.

Three cannabis plants were placed into each tent. Two of the plants were of a Cannabis indica variety, and one plant was a Cannabis sativa variety. The photoperiod used in both tents was 20 hours with lights on followed by 4 hours with lights off. All watering, nutrients, pest control, etc. were identical for all plants.

Results

The table below shows the leaf count for all plants initially and after 10 days in the grow tent. In addition, none of the plants showed any visible sign of adverse effects. Notably, in this particular experiment, the grow tent volume was about 16 times smaller than would be recommended for the pouch that was used to generate the chlorine dioxide (e.g., 240 cubic feet in the tent versus 4000 cubic feet if the product had been used in an actual cultivation environment in accordance with product instructions). This means that the concentration of chlorine dioxide for this experiment was about 16 times higher than would be used in an actual cultivation environment.

TABLE 3

Effects of chlorine dioxide treatment on vegetative growth of cannabis plants.

| Plant | Leaf Count | | |
|---|---|---|---|
| | Initial | Final | # of new leaves |
| Control | | | |
| Indica | 22 | 66 | 44 |
| Indica | 21 | 98 | 77 |
| Sativa | 35 | 62 | 27 |
| Experimental | | | |
| Indica | 24 | 92 | 68 |
| Indica | 25 | 61 | 36 |
| Sativa | 31 | 83 | 52 |

Example 3

Toxicity Responses of Cannabis Plants to Foliar Applications of Chlorine Dioxide Regular and excessive rates of chlorine dioxide dissolved in water were sprayed up to five times at 2-day intervals on two varieties of cannabis plants in both vegetative and flowering stages to determine if plant damage would result. Adverse effects were assessed based on visible discoloration or chlorosis of leaves and/or flowers. All plants were monitored for several days after the final application of chlorine dioxide.

Experiments were performed in a greenhouse with temperatures between 70° F. and 80° F. Plants were potted in soil and appeared healthy and undamaged prior to treatment. All plants received the same amount of water and nutrients as controls, delivered via soil drenching. All plants, including controls, were the same age. At the beginning of the experiments, both flowering and vegetative plants had 3 weeks of the respective growth stage remaining.

Concentrations of chlorine dioxide tested include 0, 50, 100, and 500 ppm. All chlorine dioxide solutions were prepared from 500 ppm stock solution, mixed in containers and used immediately. Each of the rates was tested in triplicate with separate plants in both stages of growth and with Cannabis indica and Cannabis sativa cannabis plants. A common trigger sprayer bottle with the tip adjusted to a mist setting was used to apply treatments. Plants were sprayed until all leaves and stems were visibly wet. Each treatment rate was applied at 2-day intervals, and the number of applications ranged from 1 to 5 depending on the amount of damage that occurred to the plant.

Damage was assessed 2 days after an application and prior to the next application. Treated plants were assessed for damage 6 days after the 5th and final spray treatment. Observed symptoms associated with the application of chlorine dioxide were necrosis of leaf tissue appearing as lesions between and across leaf veins and at leaf margins. Early symptoms included yellowing of leaves. Some lesions had dark brown borders and/or appeared desiccated.

No foliar or flower tissue damage was visible for plants treated with 0 or 50 ppm chlorine dioxide (five applications at 2-day intervals), and plants treated with 50 ppm chlorine dioxide were indistinguishable from the control plants treated with water.

Vegetative plants of both varieties treated with 100 ppm chlorine dioxide exhibited visible damage to leaves following the fourth application. None of the sativa-type flowering plants exhibited damage to leaves or flowers at 100 ppm chlorine dioxide. Two out of the three indica-type flowering plants treated with 100 ppm chlorine dioxide only exhibited damage to leaves two days after the 4th application. All plants treated with 500 ppm chlorine dioxide exhibited leaf damage 24 to 48 hours after a single application. Damage to floral tissue was evident as some discoloration after the third application in 1 of the 3 sativa-type plants and 2 of the 3 indica-type plants. All plants treated with 500 ppm chlorine dioxide exhibited tissue damage after the fifth application and did not have the same smell as control plants. This was attributed to oxidation of terpenes produced in the flower.

Example 4

Toxicity Responses of Cannabis Plants to Applications of Gaseous Chlorine Dioxide Two varieties of cannabis plants in both vegetative and flowering stages were exposed to various amounts of chlorine dioxide gas to determine if plant damage would result. Adverse effects were based on discoloration or chlorosis type damage to leaves and/or flowers. Leaves of each plant were collected prior to experiments and again 2 days post treatment for tissue analysis. Leaf samples were sent to a third-party laboratory for analysis of nutrients and total chloride ($Cl^-$). Tissue analysis of leaves pre- and post-treatment were compared to determine uptake of chlorine dioxide and/or its by-products. Control plants were used for visual comparison in determining plant damage. All plants were monitored for several days after application of chlorine dioxide gas. Plants were potted in soil and appeared healthy and undamaged unless otherwise noted. All plants including controls were of the same age for each growth stage.

The chlorine dioxide gas exposure was based on concentration with units of mg of chlorine dioxide per cubic foot of space.

As a reference, baseline readings of the concentration of chlorine dioxide monitored in a space that was clean and devoid of anything that can consume chlorine dioxide are shown in supplemental excel documents.

Baseline Readings

The concentration versus time data for the release of chlorine dioxide gas shows the peak concentration achieved is consistent with the amount of chlorine dioxide that is added to the space. In addition, doubling the amount of chlorine dioxide in the same volume of space doubles the concentration. Then by decreasing the volume of space by 6.4 times and adding the same amount of chlorine dioxide, concentration increased by 6.4 times. Based on this, an estimation of the peak concentration of chlorine dioxide can be made using various weights of chlorine dioxide and volume of space.

Trial 1

A first trial was performed in a space of 1550 cubic feet with four healthy plants in the space, two of which were in flower at week 5 of 8, and the other two of which had one week of vegetative stage remaining. The chlorine dioxide dose was 1.9 mg chlorine dioxide per cubic foot of space (one 25 g ProKure G Fast Release Gas packet (ProKure Solutions, Phoenix, Ariz.) and 4 liters of 500 ppm chlorine dioxide solution). Contact time was 18 hours, and the room was maintained in darkness for the duration of the contact time.

Immediately following the 18 hours of contact time, the plants still appeared healthy. After 24-48 hours post-treatment, all 4 plants showed damage in the form of yellowing and chlorosis. Many leaves appeared desiccated and eventually fell off. Although none of the 4 plants died, the damage was too extensive to be considered a viable dose. A dose of 1.9 mg chlorine dioxide per cubic foot was considered detrimental.

Figure 1:
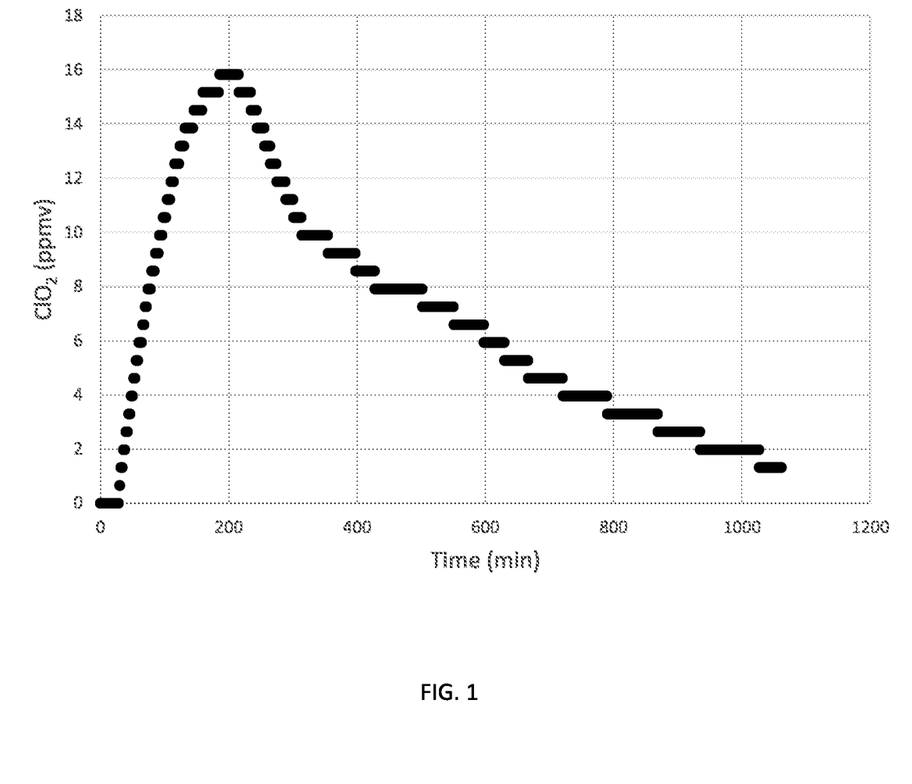
FIG. 1 depicts a graph of chlorine gas production over time in a controlled environmental agriculture setting under certain conditions.

The theoretical maximum concentration is approximately 23 ppmv (parts per million by volume) chlorine dioxide. FIG. 1 shows a plot of chlorine dioxide concentration measured in the 1550 ft3 room during the 18-hour chlorine dioxide treatment. The chlorine dioxide concentration reached a measured maximum of about 16 ppmv. In theory, the plants present in the room are responsible for consumption of the chlorine dioxide, and the difference in maximum as well as the decrease in chlorine dioxide concentration over time are attributed to the consumption of chlorine dioxide by the plants in the space. The lower concentration can be explained by the plants acting as a sink for the gaseous chlorine dioxide. As the gas equilibrates throughout the space it contacts the plants and is consumed. Also, as the chlorine dioxide concentration decreases over time, the rate of contact and rate of consumption likewise decreases.

Trial 2

A second trial was performed in a space of about 33400 cubic feet with 840 flowering plants at week eight of an eight-week cultivation cycle. All plants were healthy. This is the same situation as in Trial 3 but the plants in Trial 2 did not have mold. The chlorine dioxide dose was 0.45 mg chlorine dioxide gas per cubic foot of space. Contact time was 18 hours, and the room was maintained in darkness for the first 12 hours, and grow lights came on for the last 6 hours of contact time, but the chlorine dioxide gas concentration monitoring was only performed for about 10 hours.

Figure 2:
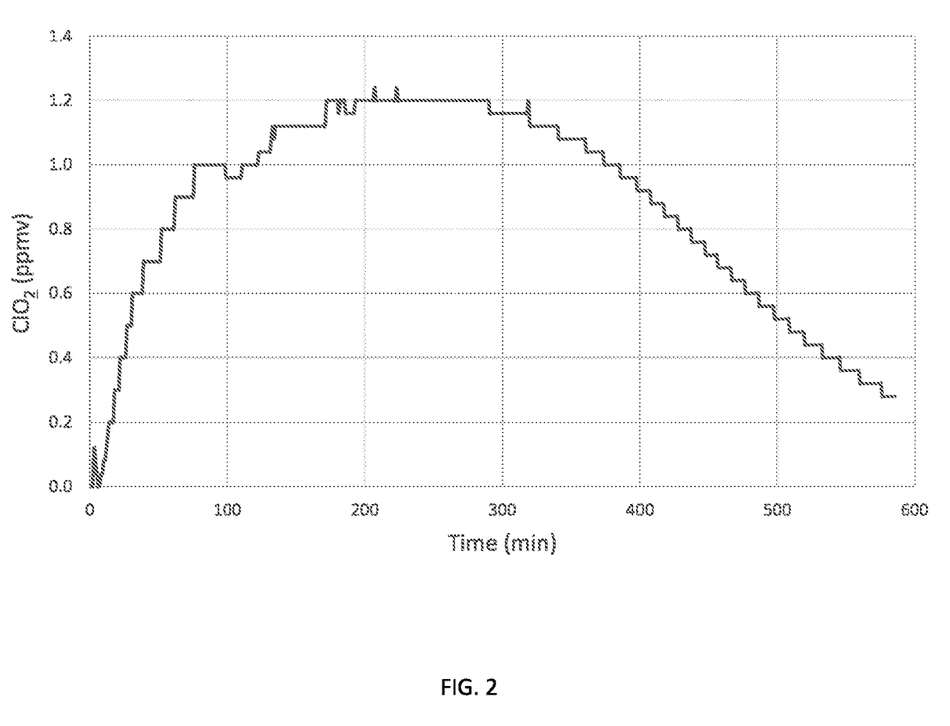
FIG. 2 depicts a graph of chlorine gas production over time in a controlled environmental agriculture setting under certain conditions.

The theoretical maximum concentration is approximately 5 ppmv chlorine dioxide. FIG. 2 shows a plot of chlorine dioxide concentration measured in the room during the first 10 hours of the 18-hour chlorine dioxide treatment. The chlorine dioxide reached a measured maximum of about 1.2 ppmv. Without wishing to be bound by theory, the plant tissue present in the space are assumed to be responsible for consumption of the chlorine dioxide. The difference in maximum chlorine dioxide concentration as compared to dispensing an equivalent quantity of chlorine dioxide in an empty space, as well as the rate of chlorine dioxide decrease after the maximum measured concentration was achieved, were attributed to the consumption of chlorine dioxide by the plants in the space. All plants remained healthy and undamaged by the 0.45 mg chlorine dioxide per cubic foot exposure rate.

Trial 3

A third trial was performed in a 33400 cubic foot space with 840 flowering plants at week eight of an eight-week cultivation cycle. Most plants had visible mold growing on flowers. The chlorine dioxide dose was 0.45 mg chlorine dioxide gas per cubic foot of space. Contact time was 18 hours, the room was maintained in darkness for the first 12 hours, and grow lights came on for the last 6 hours contact time, but the chlorine dioxide gas concentration monitoring was only performed for about 10 hours.

Figure 3:
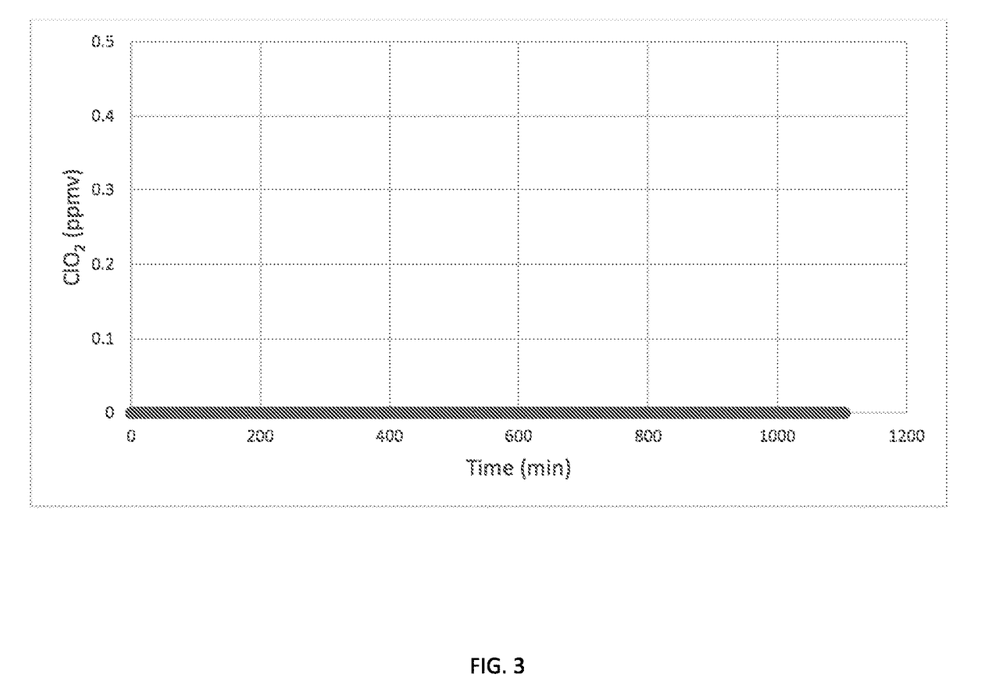
FIG. 3 depicts a graph of chlorine gas production over time in a controlled environmental agriculture setting under certain conditions.

The HVAC system for the 33400 cubic foot space that had 840 flowering plants in the last week of flower failed. Within hours the temperature and humidity increased, and visible mold growth was found on most of the flower within 24 hours. To treat the mold and potentially prevent the loss of over 100 pounds of *cannabis* flower product, a dose of 0.45 mg chlorine dioxide gas per cubic foot was dispensed into the space (14× ProKure G Fast Release Gas packets (25-gram) (ProKure Solutions)). As can be seen in FIG. 3, the measured concentration of chlorine dioxide over 18 hours was 0 ppmv. Essentially, it was never above the detection limit of the sensor (0.5 ppmv). In addition, there was no chlorine dioxide smell during the 18-hour treatment period. An odor would be expected for this application rate, so the lack of odor provides further evidence that the concentration of chlorine dioxide remained below the odor threshold of about 0.1 to 0.3 ppmv. The majority of the chlorine dioxide gas was assumed to be consumed by the mold on the plants and mold spores in the air, while some was likely consumed by other microorganisms and/or viruses within the cultivation room. No mold was visible on the plants after the application and the flower was harvested a few days later.

Plant Tissue Analysis

Levels of various plant nutrients in plant tissues were measured before and after chlorine dioxide treatment for plants in Trial 1 described above. Measured nutrient levels before and after treatment generally showed little difference (Table 4), and chloride levels of leaf tissues remained unchanged, suggesting that leaves do not uptake chlorine dioxide or its by-products. Chloride levels were of particular interest, since chloride is a typical by-product of chlorine dioxide treatment; however, no significant increase of chloride was observed for the treated plant tissues following the chlorine dioxide treatments.

TABLE 4

Plant tissue analysis results.

|  | Trial 1 Veg plants | | Trial 1 Flowering Plants | |
| --- | --- | --- | --- | --- |
|  | Before | After | Before | After |
| Nitrate ppm | 12500 | 12700 | 5500 | 5400 |
| Phosphate ppm | 2800 | 2800 | 2600 | 2400 |
| Total (N) % | 4.1 | 3.9 | 2.6 | 3.2 |
| Total (P) % | 0.76 | 0.77 | 0.35 | 0.43 |
| Potash (K) % | 3.1 | 2.9 | 2.9 | 3.1 |
| Calcium (Ca) % | 3.6 | 3.8 | 2.8 | 2.8 |
| Magnesium (Mg) % | 1.4 | 1.2 | 0.85 | 0.94 |
| Sulfur (S) % | 0.61 | 0.27 | 0.2 | 0.23 |
| Sodium (Na) % | 0.02 | 0.02 | 0.03 | 0.02 |
| Iron (Fe) ppm | 230 | 200 | 140 | 150 |
| Zinc (Zn) ppm | 48 | 51 | 36 | 39 |
| Manganese (Mn) ppm | 33 | 35 | 55 | 52 |
| Copper (Cu) ppm | 7.1 | 7.5 | 8.5 | 9.7 |
| Boron (B) ppm | 99 | 92 | 50 | 65 |
| Molybdenum (Mo) ppm | 0.74 | 0.69 | 1.7 | 1.8 |
| Chloride (Cl$^-$) ppm | 5600 | 5300 | 24900 | 24600 |

CONCLUSIONS

The difference in theoretical maximum concentration and actual concentration of each trial varied depending on how many plants were in the space and whether the plants had mold on them or not. Trial 1 with 4 plants (387.5 cubic feet per plant) reached 70% of the maximum. Trial 2 reached about 23% of the maximum with 840 (37.4 cubic feet per plant) healthy with no mold on plants. Trial 3, with plants carrying a heaving mold load, did not reach a measurable chlorine dioxide concentration. In the trials that yielded concentration versus time data (trials 1 and 2) the maximum concentration was met at about the same length of time that the clean room experiments (see supplemental excel files) yielded, but in the trials the concentration decreases much quicker, demonstrating that the gas is being consumed by the plants. chlorine dioxide consumption in a defined space is dependent on the organic matter load in the space, including both plant tissue and any microbial matter present in the space, in addition to other environmental parameters.

Example 5

Chlorine Dioxide Treatment and Prevention of Fungal Counts in Cultivation Setting Very low-level chlorine dioxide protection using about 3 mg chlorine dioxide gas per hour for every 4000 cubic feet (50-gram ProKure D Extended Release Gas product (ProKure Solutions), 2000 mg total over 4 weeks) was tested to determine the effects on reduction and prevention of fungal microorganism counts. The rate of chlorine dioxide production will vary depending on the relative humidity (RH) in the room. The above rate is for RH range of 40-60%. Each 3 mg chlorine dioxide per hour product (50-gram) unit will cover 4000 cubic feet of space. The 4000 cubic foot volume is recommended for safety reasons. This volume of space insures that the concentration of the gas remains below the OSHA regulated Permissible Exposure Limit (PEL) which is 0.1 ppmv (time weighted average (TWA) over a 8-hours per day or 40-hour work week) and the Short Term Exposure Limit (STEL) which is 0.3 ppmv (TWA over any 15-minute period) for chlorine dioxide.

By calculation, if 3 mg of chlorine dioxide gas is released over a 1-hour period into a space that is 4000 cubic feet, the concentration would be approximately 0.007 ppmv at the end of the 1-hour period. Even after 14 hours of chlorine dioxide dispensed at the above rate, the chlorine dioxide concentration will be less than 0.1 ppmv, or under the PEL.

Chlorine dioxide will break down upon exposure to light. The half-life decreases as a function of increasing light intensity and is also dependent on the wavelength of light. Since the decomposition is highly dependent on the nature of the light, it is difficult to determine a generic half-life for use in any type of calculation. For reference, the half-life is about 300 minutes under fluorescent lights found in a typical office building and is likely about 10 minutes when exposed to intense sunlight. An advantage of this decomposition is that it can help to minimize exposure of employees, since employees are typically present in a treated cultivation space during daylight hours when sunlight and/or grow lights are likely to be on.

Experimental Data

All data is based on the dose described a unless otherwise noted. The spore counts per cubic meter prior to treatment are compared to spore counts per cubic meter post treatment with the treatment time indicated. All spore trap data was collected using a typical inertial impaction sampler. All samples were collected using an Air-O-Cell spore-trap (Zefon International, Ocala, Fla.) with a total of 75 liters of air being drawn through the trap over a 5-minute period. Each spore trap was sent to a professional laboratory for analysis. The analysis includes the identification and enumeration of each type of mold spore found in the sample with results given as the number of each type of spore and the total spores per cubic meter.

An experimental trial was performed in a greenhouse with approximately $1\times10^6$ cubic feet of space holding 4500 mother plants. All plants were potted in soil and were approximately 5-7 feet tall, depending on whether cuttings had recently been taken for clone propagation. Plants evidenced visible signs of infection with an unidentified fungal strain having an appearance similar to powdery mildew. The fungus was actively growing and covered most leaves and major stalks. The fungus was a strain that only infected the surface of the plants and was not systemic in the plants.

Treatment was performed using 1.2 mg chlorine dioxide gas per hour per 4000 cubic feet. Spore trap testing was performed pre-treatment and at seven days post-treatment. The fungus could not be detected by visual inspection after about 30 days of treatment. Treatment continued as a preventative measure, with further spore trap testing at 45 days post treatment. Spore trap data follows below in Table 5.

TABLE 5

Results of spore trap testing for chlorine dioxide treated greenhouse holding *cannabis* mother plants showing evidence of fungal infection.

|  | Count | | |
| --- | --- | --- | --- |
| Spore Type | Pre-Treatment | 7 Days Post-Treatment | 45 Days Post-Treatment |
| *Alternaria* | 53 | 0 | 0 |
| Ascospores | 120 | 27 | 0 |
| *Aureobasidium* | 13 | 0 | 0 |
| Basidiospores | 480 | 53 | 0 |
| *Bipolaris/Drechslera* | 13 | 0 | 0 |
| *Chaetomium* | 13 | 0 | 0 |
| *Cladosporium* | 1500 | 54 | 0 |
| *Fusarium* | 13 | 0 | 0 |

TABLE 5-continued

Results of spore trap testing for chlorine dioxide treated greenhouse holding *cannabis* mother plants showing evidence of fungal infection.

| | Count | | |
|---|---|---|---|
| Spore Type | Pre-Treatment | 7 Days Post-Treatment | 45 Days Post-Treatment |
| Oidium | 164 | 13 | 0 |
| Penicillium/Aspergillus | 134 | 0 | 0 |
| Smuts/Myxomycetes | 107 | 173 | 13 |
| Torula | 13 | 0 | 0 |
| Ulocladium | 13 | 0 | 0 |
| Total | 2636 | 320 | 13 |

Example 6

Post-Harvest Remediation of *Cannabis* Flower and Trim Material

Harvested *cannabis* flower and/or trim (leaf and stem tissue used for the extraction of cannabinoids) are treated with chlorine dioxide gas to reduce the presence of viable microorganisms that may give rise to non-passing microbial rates in product safety tests. Several individual small batches of flower and trim are exposed to various rates of chlorine dioxide to determine effective rates for decreasing the levels of microorganism contamination as well as to determine rates which may produce negative impacts on product quality parameters such as cannabinoid or terpene levels, considered either as total cannabinoids or terpenes, or at the individual cannabinoid or terpene level.

Freshly harvested *cannabis* flower and trim materials are divided into measured batches of equal quantities by material weight. Batches of material are placed in curing chambers or substantially air-tight chambers of suitable volume. Samples are removed from each batch of material for pretreatment microbial testing and phytochemical analysis. A small fan may be placed in a chamber to ensure effective air circulation through the chamber. Chlorine dioxide is deployed in a manner suitable to produce target chlorine dioxide gas concentration in chamber over a desired treatment duration. Following treatment, the chamber is ventilated and treated material removed to an appropriate container, and samples of treated material (including untreated control sample) are sent for microbial testing and phytochemical analysis.

Example 7

Evaluation of Room Turn Protocol on Environmental Microbial Load

Study areas consist of different rooms of identical dimensions within an indoor *cannabis* cultivation facility. Each room is fully enclosed and 30 ft wide by 90 ft long with a 12 ft ceiling height to yield an enclosed volume of 32,400 ft$^3$. Environmental conditions are optimized for the cultivation operation. Relative humidity ranges from 55-65%, and temperature ranges from 72-78° F. A centralized HVAC system provides air handling for the entire facility, and each room is not individually maintained. Within each room, air is distributed using several fans mounted on walls and with air handlers attached to flexible and perforated 18" tubing mounted above the canopy. Lights are positioned at about 10 feet from the floor.

Room Turn Protocol

Prior to the current study, each room contained approximately 800 flowering *cannabis* plants that had been growing in the space for approximately 8 weeks. Initial sampling is performed approximately 4 hours after harvesting of the plants from each room to ensure the lack of false positives due to the high activity of harvesting and prior to any type of cleaning or sanitizing/disinfecting. HVAC ducts closed during treatment to prevent air exchange via the HVAC system. A general cleaning is performed for each room prior to application of any chlorine dioxide. After general cleaning, the test room is cleaned using a chlorine dioxide solution with 100 ppm chlorine dioxide in water is applied at 1 gallon per 250 ft2 to all surfaces compatible with water exposure (walls, floors, fans, drains, etc.) and allowed to air dry for 10-20 minutes. Following application of the chlorine dioxide solution, gaseous chlorine dioxide is deployed at a rate of about 1000 mg per 2250 ft3 (15000 mg chlorine dioxide gas total). The gas is contained in the room overnight or about 10 hours. No chlorine dioxide solution or gas is used for the second, control room following the general cleaning.

Following cleaning, the rooms are used for cultivation of another crop of 800 *cannabis* plants in each room. Plants are in 3-gallon pots with soil as media and automated drip irrigation/fertigation being used. Plants are grown to flowering, and environmental microbial sampling is performed for each from at several points during the flowering period.

Sampling Procedure

Environmental microbial sampling is performed using a passive air sampling technique and 9 cm diameter Petri dishes containing potato dextrose agar (PDA). The sampling height is set to 1 M which approximates the canopy height of the plants in the flowering bay. Sampling time is 15 minutes. After exposure, the plates are taken to the laboratory and incubated at 72° F. for 7 days. Surface samples are also taken using standard techniques. The number of colony-forming units (CFU) per unit volume in each room is determined for each plate using standard methods, and results for the treated versus untreated rooms are compared.

Example 8

Effect of Low-Level Gaseous Chlorine Dioxide Application on Airborne Microorganism Load and Flower Quality Parameters for Flowering *Cannabis*

*Cannabis* plants are grown in identical, adjacent cultivation bays in an indoor cultivation facility using standard methods. Plants are genetically and developmentally identical and cultivated under identical environmental conditions monitored using standard equipment. A treatment room is treated with gaseous chlorine dioxide at a rate of approximately 3 mg chlorine dioxide gas per hour per 4000 cubic feet (ProKure D Extended Release Gas (ProKure Solutions)) for the duration of the cultivation cycle. A control room remains untreated. Plants are grown to maturity and harvested. Airborne microbial sampling is performed using settling plates on a weekly basis throughout the cultivation cycle. Following harvest, flower material is extracted and phytochemically profiled using standard techniques to determine any impact of chlorine dioxide treatment on quantitative and qualitative phytochemical crop quality attributes including detailed cannabinoid and terpene constituents.

Example 9

Effect of Proactive Low-Level Gaseous Chlorine Dioxide Application in Response to Weather Events on Airborne Microorganism Load in a Controlled Environmental Agriculture Setting Identical, adjacent cultivation bays in an indoor, controlled environmental agriculture setting are configured with substantially functionally equivalent environmental control capabilities and equivalent settings are applied that are suitable for cultivation of floriculture or specialty vegetable crops. Interior and ambient (outdoor) environmental conditions are continuously monitored, along with predicted weather events for the ambient environment. Interior airborne microbial populations are actively and passively sampled using standard techniques on a daily basis to quantitatively and qualitatively assess the composition of airborne microorganisms in each cultivation bay. Low-level gaseous chlorine dioxide is continuously dispensed in a first test cultivation bay at a concentration compatible with crop production without detrimental crop impact. Low-level gaseous chlorine dioxide is likewise continuously dispensed in a second test cultivation bay, with additional dispensation of a rapid release gas chlorine dioxide treatments (such as ProKure G Fast Release Gas product (ProKure Solutions)) in response to anticipated or actual adverse weather events correlated with increased airborne microbial populations, the rapid release gas chlorine dioxide treatment also compatible with crop cultivation without detrimental crop impact. An otherwise equivalent control cultivation bay receives no chlorine dioxide treatment. The experiment is maintained through one or more rain events with rainfall of more than 5 mm, with rapid release gas chlorine dioxide treatment dispensed the day before the rain event, the day of the rain event, and the day following the rain event. Total airborne microbial counts and microbial counts by specific microorganism are determined for each cultivation bay for each day of the experimental time course. Daily total and specific microorganism counts are compared for each cultivation bay across the experimental time period. The experiment is repeated to assess typical patterns of airborne microbial counts in response various types of meteorological events.

Example 10

Empiric Determination of Rates of Gaseous Chlorine Dioxide Consumption by Airborne Microorganisms Three identical, adjacent cultivation bays in an indoor, controlled environmental agriculture setting are configured with substantially functionally equivalent environmental control capabilities and equivalent settings are applied that are suitable for cultivation of floriculture or specialty vegetable crops. Interior environmental conditions are continuously monitored. A room turn cleaning protocol is performed prior to initiation of experimental treatments to substantially eliminate baseline airborne microbial populations. Interior airborne microbial populations are actively and passively sampled using standard techniques on an hourly basis during the experimental treatments to quantitatively and qualitatively assess the composition of airborne microorganisms in each cultivation bay. Gaseous chlorine dioxide concentrations in each cultivation bay are continuously monitored throughout each experiment. Experimental airborne microbial loads are artificially created in two of the three cultivation bays by aerosolizing and dispersing known quantities of various selected airborne microorganisms common in controlled environmental agriculture settings to produce calculated airborne populations of the selected microorganism. Calculated airborne microorganism population concentrations in each bay are verified by hourly experimental sampling. Gaseous chlorine dioxide is dispensed in a test cultivation bay at a first concentration. A first control cultivation bay with experimentally dispersed microorganisms receives no chlorine dioxide treatment. A second control bay not subject to experimentally dispersed microorganisms receives the same chlorine dioxide treatment as the test cultivation bay. Chlorine dioxide concentration levels in the test and control bays are continuously monitored in parallel with the airborne microbial population sampling to establish a baseline measured chlorine dioxide concentration curve, a baseline airborne microbial concentration curve for the selected experimentally dispersed microorganism, and chlorine dioxide and airborne microbial concentration curves for the test cultivation bay in which both are present and interacting. Test and control curves are compared to determine the airborne microorganism concentration dependent chlorine dioxide consumption rate under characterized environmental conditions. The experiment is repeated with changes to variables including the selected microorganism, mixed microorganism populations, dispensed chlorine dioxide levels, and various environmental condition parameters including temperature, relative humidity, light intensity, presence of soil media, presence of plant biomass, and the like, to empirically elucidate the interactions of various airborne microorganism conditions and environmental parameter conditions on consumption of gaseous chlorine dioxide in a controlled environmental agriculture setting.

Example 11

Empiric Determination of Rates of Gaseous Chlorine Dioxide Consumption by Plant Biomass Three identical, adjacent cultivation bays in an indoor, controlled environmental agriculture setting are configured with substantially functionally equivalent environmental control capabilities and equivalent settings are applied that are suitable for cultivation of floriculture or specialty vegetable crops. Interior environmental conditions are continuously monitored. A room turn cleaning protocol is performed prior to initiation of experimental treatments to substantially eliminate baseline airborne microbial populations. Interior airborne microbial populations are actively and passively sampled using standard techniques on a daily basis during the experimental treatments to quantitatively and qualitatively assess the composition of airborne microorganisms in each cultivation bay. Gaseous chlorine dioxide concentrations in each cultivation bay are continuously monitored throughout each experiment. Plant biomass loads are created in two of the three cultivation bays by introducing various selected controlled environmental agriculture crops in various stages of development for different iterations of the experiment outlined herein. Calculated and/or measured plant biomass parameters are determined for each test crop, prior to and/or during the course of experimental testing. Crop health and/or crop quality parameters are likewise monitored or evaluated during and/or following experimental testing to evaluate the impact of chlorine dioxide treatment on crop health and quality.

Gaseous chlorine dioxide is dispensed in a test cultivation bay at a first concentration. A first control cultivation bay with experimental plant biomass receives no chlorine dioxide treatment. A second control bay not subject to experimental plant biomass receives the same chlorine dioxide treatment as the test cultivation bay. Chlorine dioxide concentration levels in the test and control bays are continuously monitored in parallel with the airborne microbial population sampling to establish a baseline measured chlorine dioxide concentration curve, a baseline crop health and/or crop quality curves for the selected experimental crop serving as the test plant biomass, and chlorine dioxide and crop health and/or crop quality curves for the test cultivation bay in which both are present and interacting. Test and control curves are compared to determine the plant biomass dependent chlorine dioxide consumption rate under characterized environmental conditions. The experiment is repeated with changes to variables including the selected crop type and developmental stage, dispensed chlorine dioxide levels, and various environmental condition parameters including temperature, relative humidity, light intensity, presence of soil media, presence of airborne or plant-borne microorganisms, and the like, to empirically elucidate the interactions of various plant biomass conditions and environmental parameter conditions on consumption of gaseous chlorine dioxide in a controlled environmental agriculture setting.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices, systems, and methods are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A method of microorganism control in a plant cultivation environment comprising:

determining, at a first time and a first location, a first plant biomass parameter;

determining, at the first time, a first air sample mold spore count from a first air sample collected at the first location;

determining, at the first time and the first location, a first cultivation environment parameter;

determining a first application rate of a gaseous chlorine dioxide in response to one of the first plant biomass parameter, the first air sample mold spore count, and the first cultivation environment parameter, wherein the first application rate is calculated to produce one of an estimated gaseous chlorine dioxide concentration and a measured gaseous chlorine dioxide concentration;

applying the gaseous chlorine dioxide in the plant cultivation environment at the first application rate for a first treatment period;

determining, at a second time, a second air sample mold spore count from a second air sample collected at the first location; and determining a microorganism control effect produced in response to the applying the gaseous chlorine dioxide for the first treatment period by comparing the second air sample mold spore count to the first air sample mold spore count;

wherein the plant cultivation environment comprises an indoor cultivation facility, and wherein the applying the gaseous chlorine dioxide at the first application rate for the first treatment period is effective to reduce the air sample mold spore count from the first air sample mold spore count to the second air sample mold spore count.

2. The method of claim 1, further comprising:

determining, at the first time, a first crop parameter;

determining, at the second time, a second crop parameter;

determining a crop effect produced by the applying the gaseous chlorine dioxide for the first treatment period by comparing the second crop parameter to the first crop parameter, wherein the crop effect comprises one of a cannabinoid or a terpene concentration change; and adjusting, in response to one of determining the microorganism control effect and determining the crop effect, the first application rate to a second application rate.

3. The method of claim 1, wherein the first plant biomass parameter comprises one of a plant type, a plant growth stage, a plant number, a total plant biomass, a total plant surface area, and a plant surface area attribute.

4. The method of claim 1, wherein the first cultivation environment parameter comprises one of relative humidity, airflow level, airflow pattern, light cycle, light intensity, light wavelength, and temperature cycle.

5. The method of claim 1, wherein the one of the estimated gaseous chlorine dioxide concentration and the measured gaseous chlorine dioxide concentration does not exceed about 0.1 ppmv during the first treatment period.

6. The method of claim 1, further comprising:
- measuring, between the first time and the second time, a first measured gaseous chlorine dioxide concentration;
- comparing the first measured gaseous chlorine dioxide concentration and the estimated gaseous chlorine dioxide concentration; and
- optionally adjusting the first application rate to a second application rate in response to the comparing the first measured gaseous chlorine dioxide concentration and the estimated gaseous chlorine dioxide concentration.

7. The method of claim 1, further comprising:
- deploying, before the first time and at the first location, a process challenge device comprising one of a biological indicator and a chemical indicator; and
- determining, after the second time, a process challenge device effect of the applying the gaseous chlorine dioxide on the one of the biological indicator and the chemical indicator,
- wherein the process challenge device effect corresponds to an expected effect for application of a measured chlorine dioxide rate of from about 0.05 ppmh to about 70 ppmh.

* * * * *